United States Patent
Shen et al.

(10) Patent No.: US 10,021,026 B2
(45) Date of Patent: Jul. 10, 2018

(54) INCREMENTAL UPDATE OF A SHAPE GRAPH

(71) Applicants: HEWLETT-PACKARD DEVELOPMENT COMPANY, L.P., Houston, TX (US); HANGZHOU H3C TECHNOLOGIES CO., LTD, Hangzhou, Zhejiang (CN)

(72) Inventors: ZhiYong Shen, Beijing (CN); QunYang Lin, Beijing (CN); JunQing Xie, Beijing (CN); Peng Xie, Beijing (CN); Yong Tang, Beijing (CN); SiYu Yang, Anhui (CN); David Lee, San Mateo, CA (US); Mihalis Yannakakis, New York, NY (US)

(73) Assignees: Hewlett Packard Enterprise Development LP, Houston, TX (US); Hangzhou H3C Technologies Co., LTD, Hangzhou, Zhejiang (CN)

( * ) Notice: Subject to any disclaimer, the term of this patent is extended or adjusted under 35 U.S.C. 154(b) by 316 days.

(21) Appl. No.: 14/765,265

(22) PCT Filed: Jan. 31, 2013

(86) PCT No.: PCT/CN2013/071180
§ 371 (c)(1),
(2) Date: Jul. 31, 2015

(87) PCT Pub. No.: WO2014/117353
PCT Pub. Date: Aug. 7, 2014

(65) Prior Publication Data
US 2015/0372915 A1     Dec. 24, 2015

(51) Int. Cl.
*H04L 12/753*     (2013.01)
*H04L 12/745*     (2013.01)
(Continued)

(52) U.S. Cl.
CPC .......... *H04L 45/748* (2013.01); *H04L 45/025* (2013.01); *H04L 45/46* (2013.01); *H04L 45/48* (2013.01)

(58) Field of Classification Search
CPC ........ H04L 45/00–45/748; H04L 41/08–41/12
See application file for complete search history.

(56) References Cited

U.S. PATENT DOCUMENTS

| | | | |
|---|---|---|---|
| 6,888,838 B1 * | 5/2005 | Ji | H04L 45/54 370/392 |
| 7,948,980 B2 * | 5/2011 | Lu | H04L 45/14 370/235 |

(Continued)

FOREIGN PATENT DOCUMENTS

| | | |
|---|---|---|
| CN | 101631086 | 1/2010 |
| CN | 102307149 | 1/2012 |
| WO | WO-2014047863 | 4/2014 |

OTHER PUBLICATIONS

Haoyu Song et al., Scalable Ip Lookups using Shape Graphs, Aug. 2009 (10 pp.).

(Continued)

*Primary Examiner* — David Lazaro
*Assistant Examiner* — Julian Chang
(74) *Attorney, Agent, or Firm* — Trop, Pruner & Hu, P.C.

(57) ABSTRACT

A router has a shape graph that is a compressed form of a trie that represents routing information for routing data packets in a network, and an update data structure that includes plural entries corresponding to nodes of the shape graph, the plural entries containing count values indicating respective numbers of nodes of the tie represented by the corresponding nodes of the shape graph. The router incrementally updates the shape graph as a portion of the routing infor- (Continued)

mation changes, where the incremental updating uses information in the update data structure.

20 Claims, 8 Drawing Sheets

(51) Int. Cl.
*H04L 12/751* (2013.01)
*H04L 12/715* (2013.01)

(56) References Cited

U.S. PATENT DOCUMENTS

| | | | | |
|---|---|---|---|---|
| 8,284,787 | B2* | 10/2012 | Sahni | H04L 45/00 370/256 |
| 2002/0031107 | A1* | 3/2002 | Li | H04L 61/2015 370/338 |
| 2003/0236968 | A1* | 12/2003 | Basu | H04L 45/54 712/225 |
| 2004/0054806 | A1* | 3/2004 | Basu | H04L 45/00 709/242 |
| 2005/0195832 | A1* | 9/2005 | Dharmapurikar | H04L 45/7457 370/395.31 |
| 2006/0288024 | A1* | 12/2006 | Braica | H04L 45/00 |
| 2010/0296514 | A1* | 11/2010 | Sundstrom | H04L 45/7457 370/392 |
| 2010/0316051 | A1* | 12/2010 | Song | H04L 45/742 370/392 |
| 2011/0044499 | A1* | 2/2011 | Cobb | G06K 9/00771 382/103 |
| 2011/0128960 | A1* | 6/2011 | Bando | H04L 45/745 370/392 |
| 2011/0137930 | A1* | 6/2011 | Hao | G06F 17/30958 707/769 |
| 2012/0306670 | A1* | 12/2012 | Mickle | H03M 7/3084 341/79 |
| 2013/0036102 | A1* | 2/2013 | Goyal | G06N 5/02 707/694 |
| 2013/0218853 | A1* | 8/2013 | Bullis | H04L 41/0816 707/694 |
| 2013/0282766 | A1* | 10/2013 | Goyal | H04L 67/327 707/803 |
| 2015/0256450 | A1* | 9/2015 | Yang | H04L 45/14 370/256 |

OTHER PUBLICATIONS

Moni Naor et al., Anti-persistence: History Independent Data Structures, Stoc '01, May 2001 (16 pp.).
The State Intellectual Property Office, the P.R. China, International Search Report for PCT/CN2013/071180 dated 31 Oct. 2013 (4 pp.).
The State Intellectual Property Office, the P.R. China, Written Opinion of the International Searching Authority for PCT/CN2013/071180 dated 31 Oct. 2013 (5 pp.).
Wikipedia, Isomorphism, Nov. 2012 (7 pp.).
Yao Zhao et al., Load balanced and Efficient Hierarchical Data-Centric Storage in Sensor Networks, Jun. 2008 (9 pp.).
Yeim-Kuan Chang et al., a Fast and Memory Efficient Dynamic Ip Lookup Algorithm Based on B-Tree, 2009 International Conference on Advanced Information Networking and Applications, IEEE Computer Society, May 2009 (7 pp.).
Bando et al., FlashLook: 100-Gbps Hash-Tuned Route Lookup Architecture, IEEE 2009 (8 pp.).
Bando et al., FlashTrie: Hash-based Prefix-Compressed Trie for Ip Route Lookup Beyond 100 bps, 2010 (9 pp.) Himmt.
Broder et al., Using Multiple Hash Function s to Imp ove Ip Lookups, IEEE Infocom 2001 (10 pp.) i.
Chazelle et al., the Bloomier Filter: an Efficient Data Structure for Static Support Lookup Tables, 2004 (10 pp.) Dharmapurikar et al., Longest Prefix atMatching Using Bloom Fliters., Aug. 25-29, 2003 (12 pp.).
Eatherton et al., Tree Bitmap . Hardware/Software Ip Lookups with Incremental Updates, 2004 (21 pp.).
Huang et aL, Offset Addressing Approach to Memory-Efficient Ip Address Lookup, Eee Infocom 2011 (5 pp.).
Kumar et al, Peacock Hashing: Deterministic and Updatable Hashing for High Performance Networking., IEEE Infocom 2008 (9 pp.)
Nilsson et al., Ip-Address Lookup Using Lc-Tries, Jul. .2, 1998 (19 pp.).
Song et al.. Fast Hash Table Lookup Using Extended Bloom inter.. An Aid to Network Processing, Aug. 21-26, 2005 (12 pp.).
Song et al,: iPv6 Lookups using Distributed end Load Balanced Bloom Filters for 100Gbps Core Router Line Cards, IEEE Infocom, May 2009 (10 pp.).
Song et al., Shape Shifting Tries for Faster Ip Route Lookup, 2005 (10 pp.) Hi Mmt.
Srinivasan et al, Faster .p. Lookups using Controiled Prefix Expansion, 1998 (22 pp.).

* cited by examiner

|  KEY (406) ||| VALUE (408) ||
| --- | --- | --- | --- | --- |
| LEFT | RIGHT | DARK | ID | COUNT |
| ⓪ | ⓪ | T | ① | 3 |
| ⓪ | ① | F | ② | 1 |
| ⓪ | ① | T | ③ | 1 |
| ① | ② | F | ④ | 1 |
| ③ | ④ | F | ⑤ | 1 |
|  |  |  |  |  |
|  |  |  |  |  |
FIG. 4A
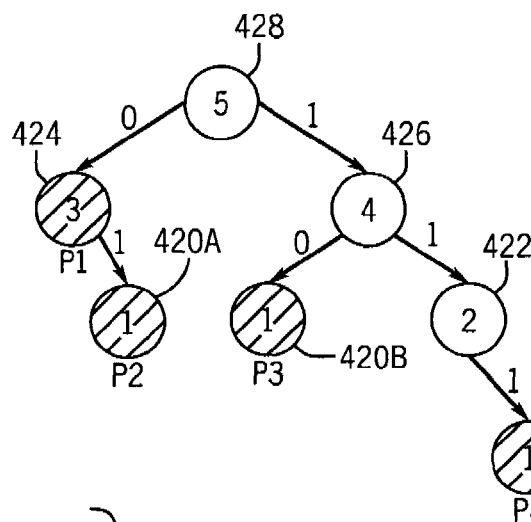
FIG. 4B
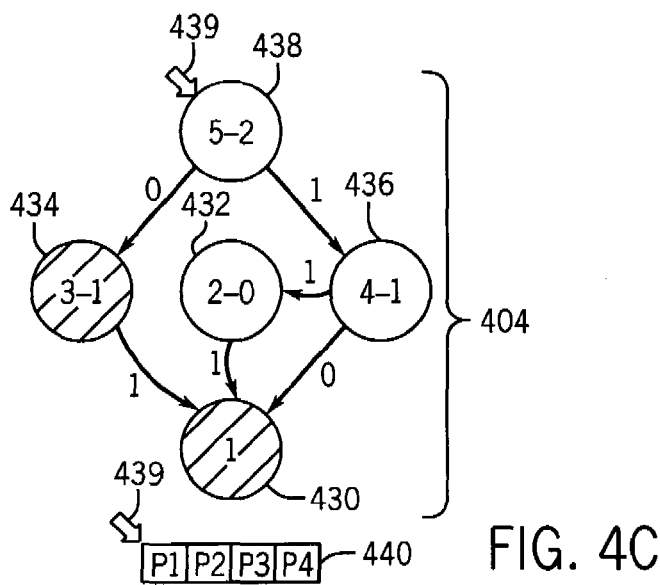
FIG. 4C

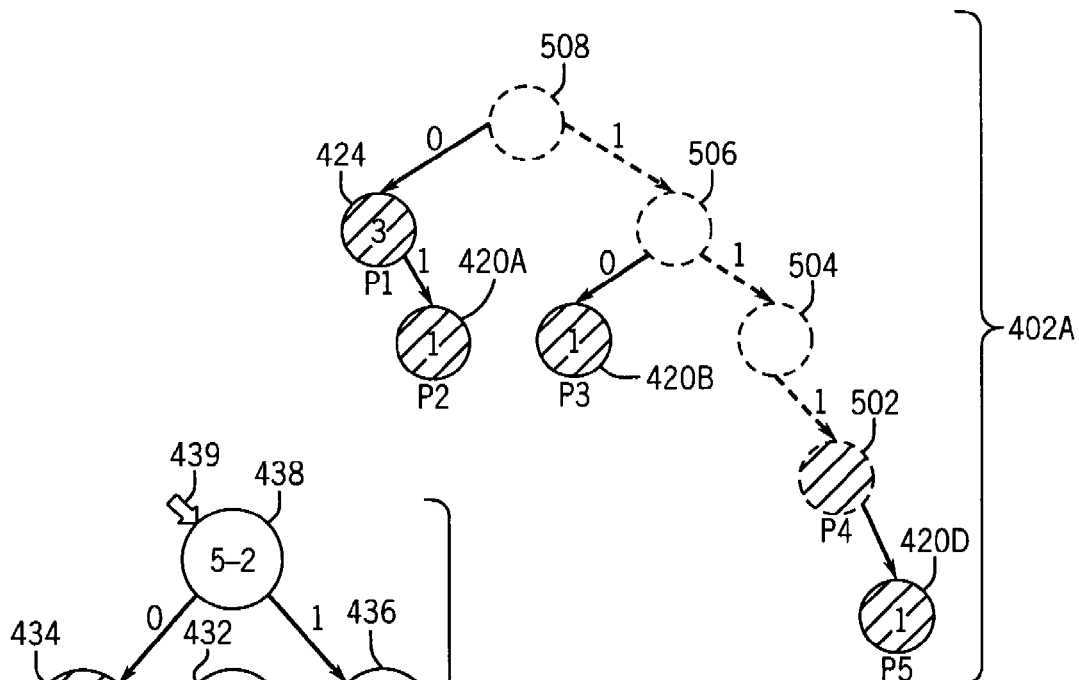
FIG. 5A
FIG. 5B
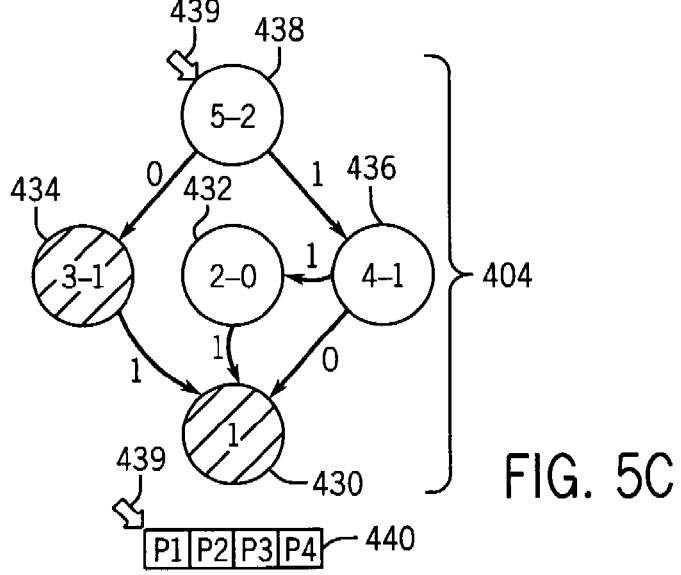
FIG. 5C

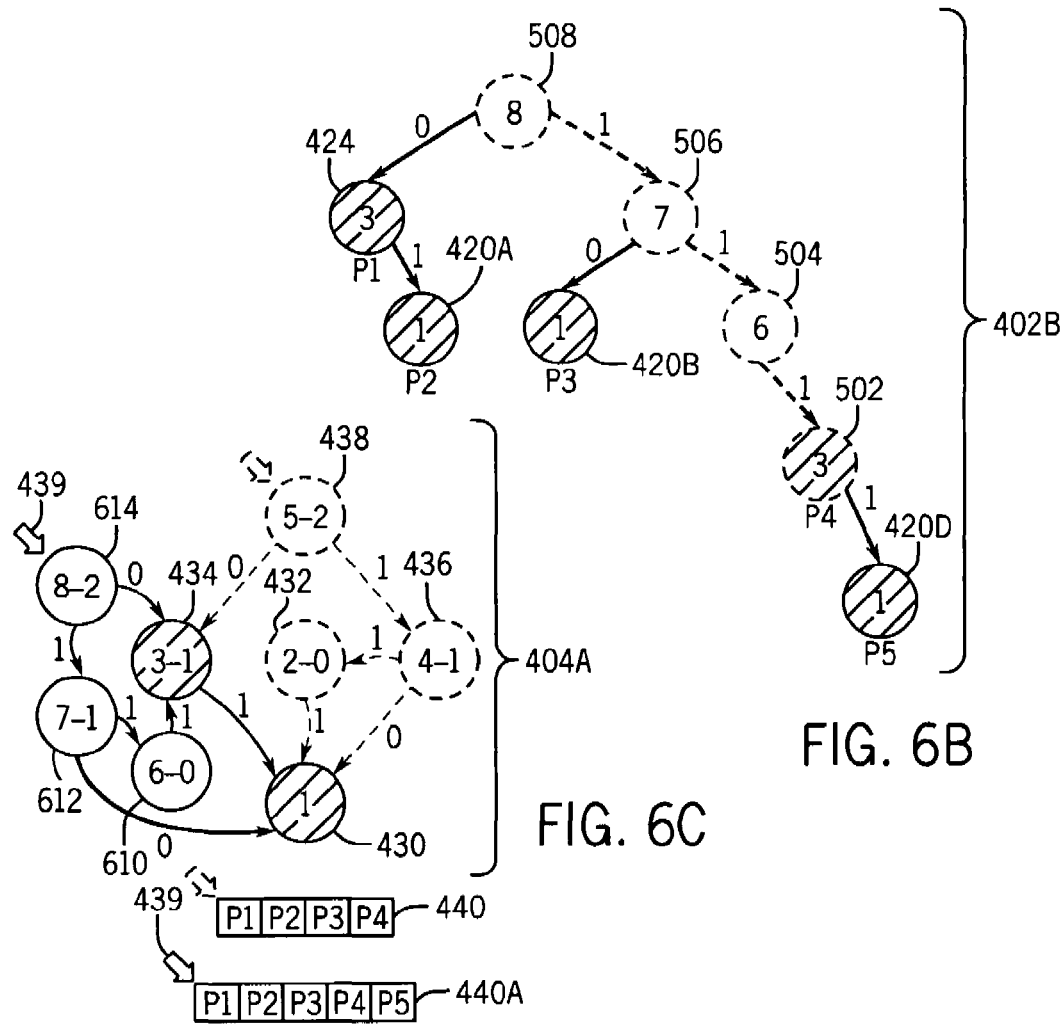

INCREMENTAL UPDATE OF A SHAPE GRAPH

BACKGROUND

Packets are routed by routers through a network, from source devices to destination devices. A packet can traverse one or multiple routers in the network. Each router can include a routing table that contains routing information for use in routing a packet to a next segment of the network. Note that the next segment can lead to another router, or the next segment can lead to a destination device.

As the number of network nodes in a network increases, the amount of routing information that may be stored in a routing table also increase correspondingly. This can lead to routing tables of relatively large size, which can impact the speed at which routers can perform a lookup of routing information in the routing tables.

BRIEF DESCRIPTION OF THE DRAWINGS

Some embodiments are described with respect to the following figures:

FIGS. 4A-4C, 5A-5C, 6A-6C, and 7A-7E are schematic diagrams illustrating updates of data structures in response to changes to routing information, according to various implementations;

DETAILED DESCRIPTION

Figure 1:
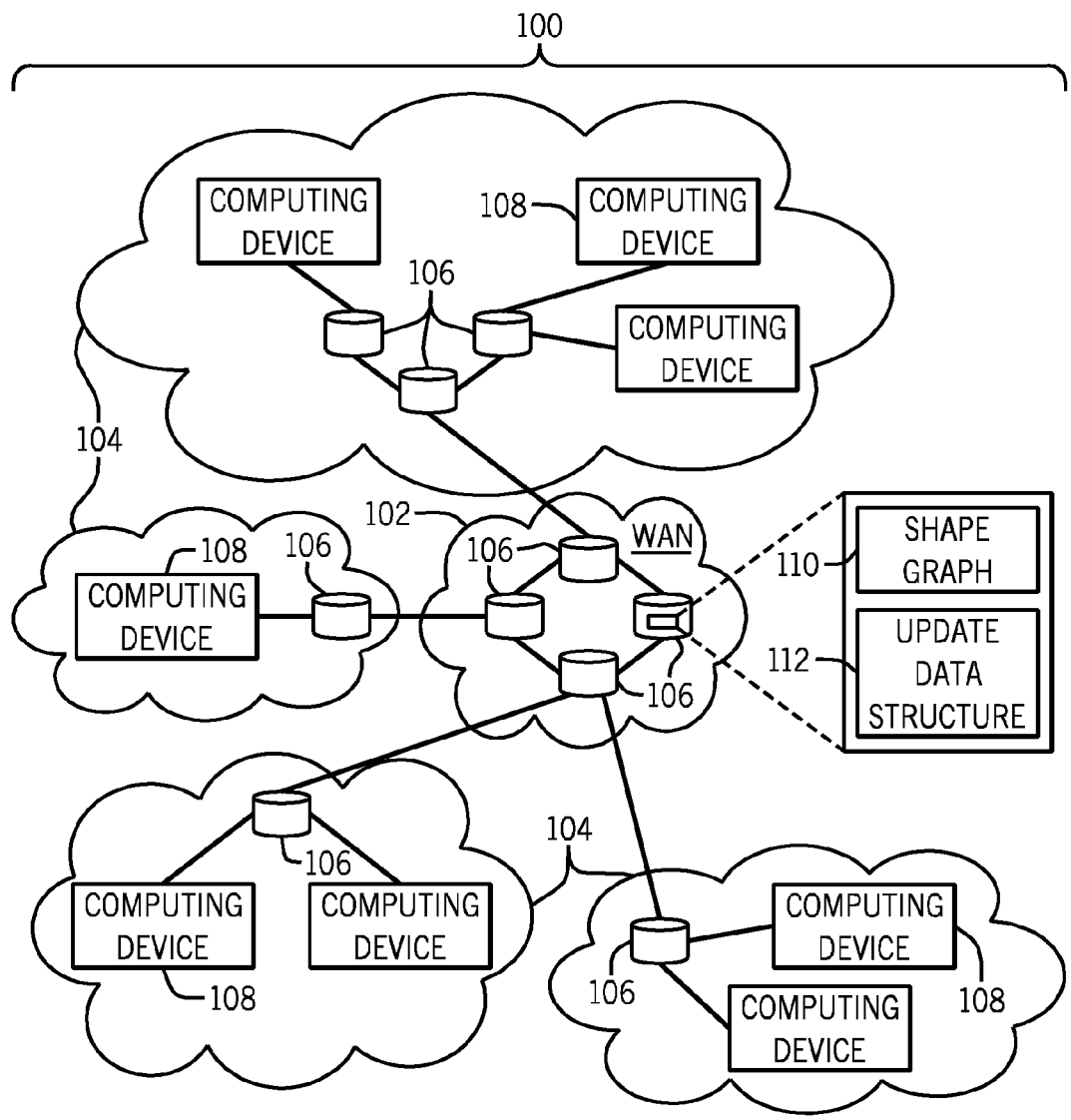
FIG. 1 is a block diagram of a networking environment that may be used to route packets between network locations, where at least one router in the networking environment incorporates some implementations.

A routing table (or more generally, a routing data structure) contains routing information to allow a router to route a packet along a path to a network destination. Although reference is made to routing tables in the ensuing discussion, it is noted that techniques or mechanisms according to some implementations can be applied to routing information contained in other types of routing data structures.

A routing table can be represented by a trie. The trie can be a binary trie, which has a number of nodes (and edges connecting the nodes) that can be searched by a router for routing a packet.

As discussed above, as networks become larger, the amount of routing information that can be contained in a routing table (as represented by a trie) can be relatively large. As a result, it may not be possible to store the entire trie in a relatively high-speed memory of the router, which can increase the amount of time involved in performing a search of the trie, since it is more likely that the router may have to access slower speed storage of the router to complete the search of the trie.

For improved efficiency and performance, a trie can be compressed to form a shape graph. The shape graph is a compressed representation of a trie, where certain groups of nodes of the trie can be combined into corresponding nodes of the shape graph. The shape graph thus consumes a smaller amount of storage space than the respective trie.

Instead of performing a search of a trie, a router can instead perform a search of the shape graph. Since it is more likely that the entirety of the shape graph (or at least a larger portion of the shape graph) can be stored in higher speed memory of the router, lookup operations for routing of packets can occur at higher speeds.

Searching the shape graph based on address information of a packet to be routed can allow the router to determine next hop information for the packet. The next hop information may include information specifying how a packet can be routed to a next segment of a network, for delivery of the packet to a network destination. The next hop information for a given packet may be determined by identifying a node in the shape graph corresponding to a longest matching prefix for a destination address in the packet. In some examples, the address contained in a packet can be an Internet Protocol (IP) address, such as an IPv4 or IPv6 address.

In some examples, a prefix for an address can refer to a portion of an IP address that is used to identify a network section. A network can be divided into multiple network sections. An IP address can have two portions: a first portion (the prefix) that identifies a network section, and a second portion that identifies a host device within the identified network section.

A shape graph is traversed based on the prefix for a destination address in an incoming packet. Different prefixes (of varying lengths) cause traversal to different nodes of the shape graph. Some of the nodes of the shape graph are associated with next hop information, while other nodes of the shape graph are not associated with next hop information. The longest matching prefix refers to the longest prefix associated with the shape graph that matches at least a portion of the prefix for the destination address of the incoming packet.

The routing information of a routing table in a router can change relatively frequently. Re-constructing data structures associated with a shape graph whenever an incremental change is made to the routing information may be inefficient, particularly for situations where the routing table contains a large amount of routing information, such that the shape graph has a relatively large number of nodes. In accordance with some implementations, techniques or mechanisms are provided for incrementally updating a shape graph in response to incremental changes to the routing information of a routing table. Incrementally updating the shape graph avoids having to completely reconstruct the data structures associated with the shape graph whenever an incremental change is made to the routing table. Rather, the data structures associated with a shape graph can be incrementally changed, which results in more efficient shape graph update processes.

FIG. 1 is a block diagram of an example networking environment 100 that may be used to route packets between network locations. The networking environment 100 may include a Wide Area Network (WAN) 102 that is communicatively coupled to a number of other networks 104 via a number of routers 106. The WAN 102 may be the Internet, and the routed packets may be IP packets. The other networks 104 within the networking environment 100 may include Local Area Networks (LANs), Metropolitan Area Networks (MANs), Virtual Private Networks (VPNs), other WANs, and so forth.

Each network 104 may include any number of computing devices 108. Examples of computing devices include desktop computers, notebook computers, tablet computers, smartphones, game appliances, server computers, storage systems, and so forth. In addition, each network 104 may include a number of routers 106. The routers 106 within a network 104 may be used to route packets between the computing devices 108 in the network 104. In some cases, a single router 106 may be used to route a packet from a source computing device 108 to a destination computing device 108 within the same network 104. In other cases, a number of routers 106 may be used to route a packet from a source computing device 108 to a destination computing device 108. For example, each router 106 that is used to transfer the packet to the destination computing device 108 may determine a next router 106, e.g. next hop, to which the packet is to be sent during the routing procedure. A shape graph lookup procedure may be performed at each router 106 to determine the appropriate next hop for the packet by searching a shape graph.

Although a specific example networking environment is depicted in FIG. 1, it is noted that in other examples, networking environments with other arrangements can be used.

In FIG. 1, at least one of the routers 106 includes a shape graph 110 and an update data structure 112 according to some implementations. As explained in further detail below, the update data structure 112 can be used for incrementally updating the shape graph 110, in response to an incremental change of routing information in a routing table. In some examples, the update data structure 112 is a mapping table (e.g. hash table) that has a number of entries, where each entry includes a key-value pair. The key is used to map to an entry (from among the multiple entries) of the mapping table 112, while the value includes information associated with the respective key in the corresponding entry. Each entry of the mapping table 112 corresponds to a respective node of the shape graph. Additional details regarding the key-value pair of a mapping table are discussed further below.

The following table is an example routing table that can be used by the router 106.

| Prefix | Next Hop Information |
| --- | --- |
| 00* | P1 |
| 01* | P0 |
| 100* | P0 |
| 101* | P3 |
| 110* | P4 |
| 111* | P2 |

Each entry of the routing table includes a prefix and a corresponding next hop information. For example, in the first entry, the prefix is 00*, and the next hop information is P1. The symbol "*" indicates that a longer prefix can match the corresponding prefix in the routing table. For example, a prefix of 0010 for an incoming packet can match the prefix 00* in the example routing table set forth above. Each prefix represents a portion of an IP address that represents a network section that is communicatively coupled to the router via an output port of the router. The next hop information includes information relating to the specific output port of the router corresponding to the prefix. Thus, for example, for prefix 101* in the routing table, the next hop information can identify the output port P3 of the router, where a packet to be routed that has a destination address corresponding to the prefix 101* would be routed through the output port P3 of the router.

More than one prefix may correspond to the same output port. For example, the prefixes 01* and 100* may both correspond to an output port P0.

To perform routing of an incoming packet using the routing table above, the longest matching prefix corresponding to a destination address of the given packet is first identified. The longest matching prefix maps to one of the entries of the routing table. The next hop information in the mapped entry of the routing table can then be used to identify the output port to which the incoming packet is to be routed.

Figure 2:
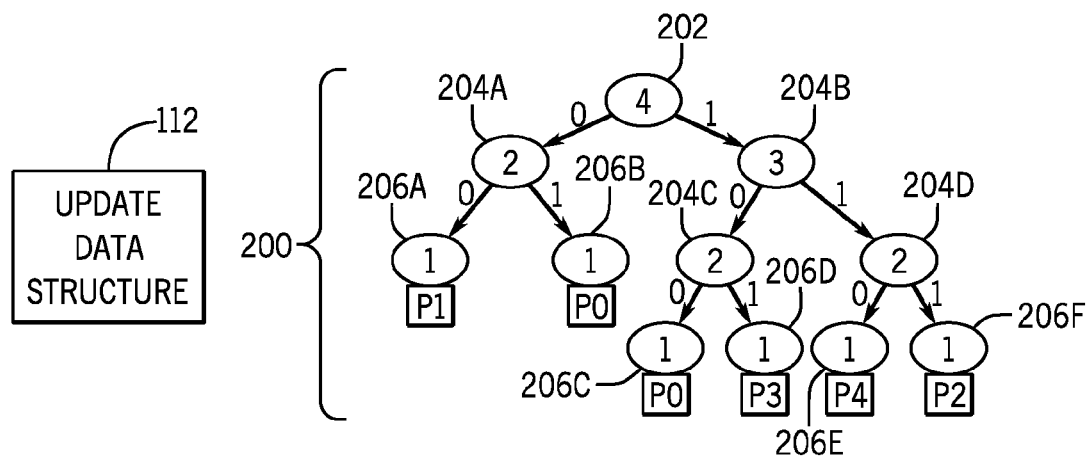
FIG. 2 is a schematic diagram of an example trie useable by techniques or mechanisms according to some implementations.

FIG. 2 is a schematic diagram of a trie 200 that represents the routing table set forth above. FIG. 2 also shows the update data structure 112 that can be used for incrementally updating a shape graph according to some implementations (as discussed further below). The trie 200 may be a binary trie with edges that may be used to organize the prefixes and the next hop information within the routing table. The trie 200 may include a root node 202 located at the top of the trie 200, a number of intermediate nodes 204 (204A, 204B, 204C, 204D shown) branching off the root node 202, and a number of leaf nodes 206 (206A-206F shown) located at the bottom of the trie 200 and branching off the intermediate nodes 204 or the root node 202.

Construction of the trie 200 may be performed by merging the prefixes within the example routing table provided above such that the root node 202 corresponds to the starting point of the lookup procedure for a prefix of an incoming packet to be routed. Each leaf node 206 is associated with specific next hop information (contained in the example routing table) relating to a longest matching prefix obtained by traversing from the root node 202 to the leaf node 206 based on the prefix of the incoming packet. In the example of FIG. 2, the leaf nodes 206A, 206B, 206C, 206D, 206E, and 206F are associated with respective next hop information P1, P0, P0, P3, P4, and P2.

As shown in FIG. 2, each edge between nodes is labeled with a "0" or "1," which correspond to respective bits of a prefix. For example, given a prefix having the most significant bits as "101," the trie 200 is traversed as follows. Starting at the root node 202, the most significant bit "1" in the prefix causes the traversal to take the right branch from the root node 202, which leads to the node 204B. The second most significant bit "0" in the prefix causes the traversal to take the left branch from the node 204B, which leads to the node 204C. The third most significant bit "1" in the prefix causes the traversal to take the right branch from the node 204C, which leads to the node 206D. The node 206D is associated with next hop information P3, as shown in FIG. 2.

The trie 200 may be compressed into a shape graph. This may be accomplished by traversing all the nodes 202, 204, and 206 within the trie 200, starting from the bottom of the trie 200, and assigning an indicator to each node 202, 204, or 206. The indicator may be used to merge the nodes 202, 204, and 206 into a number of node groups, referred to herein as "sub-tries," where each sub-trie includes identical, or isomorphic, nodes 202, 204, or 206. A first node is identical to a second node if the first and second nodes have the same shape, and they are associated with the same next hop information (NHI) flag value. The shape of a node is based on its interconnection to child nodes (if any). The NHI flag indicates whether or not the node of the trie is a dark node (in other words, whether the node is associated with next hop information). The NHI flag has a first value to indicate that the respective node is associated with next hop information, and a second value to indicate that the respective node is not associated with next hop information.

For example, the leaf nodes 206A-206F are considered to be identical, since they share the same shape (each leaf node does not include any child nodes) and they each have share the same NHI flag value (set to the first value to indicate that the leaf nodes are each associated with next hop information). Therefore, the leaf nodes 206A-206F can be considered to be part of a sub-trie that can be merged into a respective node of the shape graph. Each of the leaf nodes 206A-206F are assigned an indicator "1" as depicted in the oval corresponding to each leaf node.

Similarly, the nodes 204A, 204C, and 204D are considered to be identical, since each of the nodes 204A, 204C, and 204D have child nodes that are leaf nodes, and each has an NHI flag set to the second value to indicate that the nodes are not associated with next hop information. The nodes 204A, 204C, and 204D can be considered to be part of a sub-trie, and are assigned an indicator "2."

The node 204B has child nodes 204C and 204D that are intermediate nodes with child leaf nodes, and thus the node 204B has a different shape from nodes 204A, 204C, and 204D. Accordingly, the node 204B is part of another sub-trie and is assigned an indicator "3." The root node 202 also has a different shape from the other nodes of the trie 200, and is assigned an indicator "4."

Each sub-trie may include any number of nodes of a trie, or, in some cases, may include only one node. Further, according to the example shown in FIG. 2, the indicator assigned to a node in the trie 200 is represented by a real number in {1, 2, . . . , n}, wherein n identifies the sub-trie. However, it is to be understood that any other type of indicator may be used. The indicator can be referred to as a shape identifier (or shape ID), since the indicator identifies a shape of the corresponding sub-trie.

As discussed above, to form the shape graph, traversal of the nodes 202, 204, and 206 may be performed starting from the bottom of the trie 200, i.e. starting with the leaf nodes 206. All the leaf nodes 206 may be assigned the same shape ID, e.g. shape ID "1" as shown in FIG. 2. Then, moving upwards from the leaf nodes 206, the left and right intermediate nodes 204 may be examined, and groups of isomorphic intermediate nodes 204 may be assigned the same shape ID. For example, as shown in FIG. 2, the intermediate nodes 204A, 204C, and 204D are isomorphic and share the same NHI flag value and, thus, may be assigned the same shape ID, e.g. the shape ID "2." The process of forming the shape graph continues until the root node 202 is reached, at which point all of the sub-tries of the trie 200 have been identified and assigned respective shape IDs. The sub-tries are merged to obtain the shape graph.

The trie merging process for compressing a trie into a shape graph is effectively a labeling process from the bottom of the trie to the top of the trie, and nodes are merged if the nodes are identical in shape (the nodes have an identical left sub-trie, and an identical right sub-trie), and the nodes share the same NHI flag value.

Figure 3:
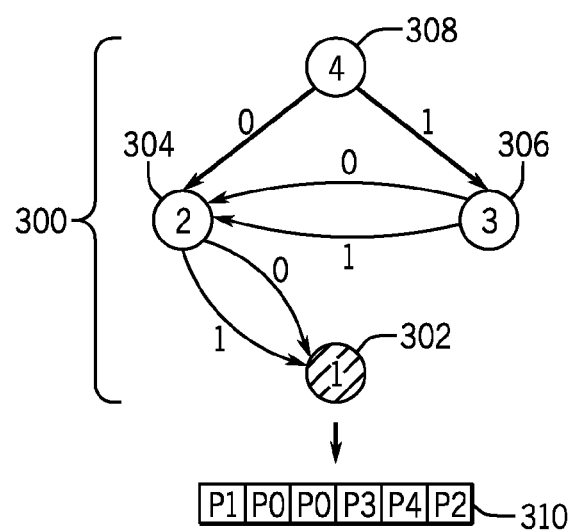
FIG. 3 is a schematic diagram of a shape graph and an associated indexing array useable by techniques or mechanisms according to some implementations.

FIG. 3 is a schematic diagram of a shape graph 300 that is generated from the trie 200, according to an example. In some cases, only one shape graph 300 may be generated from the trie 200, as shown in FIG. 3. However, in other cases, the trie 200 may be split into a number of layers, and multiple shape graphs may be generated from the multi-layer trie.

The shape graph 300 may include a dark (or black) node 302 and a number of white nodes 304, 306, and 308. The nodes in the shape graph 300 represents respective sub-tries within the trie 200.

In the example of FIG. 2, only the leaf nodes 206A-206F of the trie 200 are associated with next hop information (in the form of P0, P1, P2, P3, and P4). The leaf nodes 206A-206F are merged into a sub-trie represented by the node 302 in the shape graph 200. The respective shape ID "1" is associated with the node 302. The node 302 is a dark node since the corresponding leaf nodes 206A-206F of the trie 200 are dark nodes.

The node 304 in the shape graph 300 represents the sub-trie including nodes 204A, 204C, and 204D of the trie 200. The node 304 is associated with the shape ID "2." The nodes 306 and 308 of the shape graph, assigned shape IDs "3" and "4" respectively, represent the sub-trie including the node 204B, and the sub-trie including the node 202. Each of the nodes 304, 306, and 308 are white nodes since the respective nodes of the trie 200 are not associated with next hop information.

In different examples, if at least one of the intermediate nodes of the trie 200 is associated with next hop information, then the corresponding node of the shape graph 300 would be considered a dark (or black) node.

As further depicted in FIG. 3, the shape graph 300 is associated with an indexing array 310. The indexing array 310 has a number of positions, where each position is pointed to by a respective index. The positions of the indexing array 310 include respective next hop information, which in the example of FIG. 3 includes the following: P1, P0, P0, P3, P4, and P2. The indexes that point to corresponding positions of the indexing array 310 can start at 0. Thus, an index value of 0 would point to the first position of the indexing array 310, while an index value of 3 would point to the fourth position (containing P3) of the indexing array 310.

Since the shape graph 300 is associated with the indexing array 310, the shape graph 300 can be referred to as an indexed shape graph.

Upon receiving a packet, a search (lookup) of the shape graph 300 can be performed, which would produce a respective index value that can be used to index into the indexing array 310 to retrieve a corresponding next hop information at the indexed position in the indexing array 310.

In forming a shape graph, a mapping table can be populated. As discussed above, the mapping table is an example of the update data structure 112 shown in FIG. 1, where the update data structure 112 can be used for incrementally updating a shape graph according to some implementations.

FIGS. 4A-4C illustrate an example mapping table 400, an example trie 402, and an example shape graph 404 that is a compressed form of the trie 402.

The trie 402 represents the following example routing table:

| Prefix | Next Hop Information |
|---|---|
| 0* | P1 |
| 01* | P2 |
| 10* | P3 |
| 111* | P4 |

The mapping table 400 is populated as part of constructing the shape graph 404 from the trie 402. The trie 402 has leaf nodes 420A, 420B, and 420C, intermediate nodes 422, 424, and 426, and a root node 428. The nodes 424, 420A, 420B, and 420C are dark nodes that are associated with respective next hop information P1, P2, P3, and P4. Note that the example trie 402 includes an intermediate node (424) that is associated with next hop information.

The mapping table 400 has multiple entries (e.g. rows), where each entry includes a key-value pair. The key-value pair includes a key 406 and a value 408. The key 406 includes the shape ID of a left child node of a given node in the trie 402, the shape ID of the right child node of the given node in the trie 402, and an NHI flag value for indicating whether or not the given node is a dark node. If the given node is a dark node, then the NHI flag has a first (e.g. true or "T") value, whereas if the given node is not a dark node, then the NHI flag has a second (e.g. false or "F") value.

The value 408 of the key-value pair includes the following fields: a shape ID of the given node, and a count value that indicates a number of occurrences of nodes in the trie 402 that share the shape ID. For example, the leaf nodes 420A, 420B, and 420C of the trie 402 all have shape ID "1." Since the leaf nodes do not have any child nodes, the shape ID of the left child and the shape ID of the right child of a leaf node are each assigned the value 0 (as depicted in the first entry 410 of the mapping table 400). However, since the leaf nodes are each associated with respective next hop information (P2, P3, and P4, respectively), the NHI flag in the first entry 410 has the "T" value. The value 408 of the first mapping table entry 410 includes the following: shape ID 1 and a count having value "3," since there are three leaf nodes that share shape ID "1."

A third mapping table entry 412 corresponds to the node 424 that has shape ID "3." The node 424 of the trie 402 has no left child, but has a right child. Accordingly, the mapping table entry 412 has a left child shape ID "0" and a right child shape ID "1" (which identifies a leaf node). The node 424 in the trie 402 is associated with next hop information, and thus the NHI flag in the mapping table entry 412 has the "T" value. Since there is just one occurrence of a node having shape ID "3," the count value in the mapping table entry 412 has the value "1."

Another mapping table entry 414 corresponds to the node 426 having shape ID "4." The left child of the node 426 has shape ID 1, while the right child of the node 426 has shape ID 2. However, since the node 426 is not associated with next hop information, the NHI flag has the "F" value in the mapping table entry 414. Also, since there is just one occurrence of the node with shape ID "4," the count value in the mapping table entry 414 is equal to "1."

The other entries of the mapping table 400 are populated in similar fashion.

Nodes sharing the same shape ID and NHI flag value are considered to be part of a sub-trie that is merged into a respective node of the shape graph 404 depicted in FIG. 4C. In the example of FIG. 4C, the three leaf nodes 420A, 420B, and 420C of the trie 402 sharing shape ID "1" and the NHI flag value "T" are merged into a shape graph node 430 that has a shape ID of "1." Similarly, the trie nodes having shape IDs "2," "3," "4," and "5" are merged into respective shape graph nodes 432, 434, 436, and 438. Shape graph nodes 430 and 434 are dark nodes since they are associated with next hop information.

As further shown in FIG. 4C, each of the shape graph nodes 432, 434, 436, and 438 includes a shape ID as well as a respective dark node count number. The dark node count number indicates how many dark nodes are present in the left sub-trie of a given shape graph node. In the example of FIG. 4C, each of the shape graph nodes 432, 434, 436, and 438 is associated with SID-DNC information, where SID represents the shape ID and DNC represents the dark node count number. For example, the shape graph node 438 is associated with SID-DNC information 5-2, which indicates that the shape ID of the shape graph node 438 is "5," while the DNC is "2," which indicates that there are two dark nodes in the left sub-trie of the shape graph node 438. The left sub-trie of the shape graph node 438 includes shape graph nodes 434 and 430, which are both dark nodes.

The shape graph node 436 is associated with SID-DNC information 4-1, which includes a shape ID of "4" and a DNC of "1" (indicating that there is one dark node in the left sub-trie of the shape graph node 436). The shape graph node 432 is associated with SID-DNC information 2-0, which indicates a shape ID of "2" and that there are zero dark nodes in the left sub-trie of the shape graph node 432.

The shape graph node 434 is associated with SID-DNC information 3-1, which indicates shape ID "3" and that the left sub-trie of the shape graph node 434 has one dark node (note that the shape graph node 434 itself is considered as part of the left sub-trie).

The shape graph 404 is associated with an indexing array 440 depicted in FIG. 4C, where the indexing array 440 includes four positions that contain respective next hop information P1, P2, P3, and P4. A root pointer 439 is associated with the shape graph 404 points to the location of the indexing array 440.

To route a packet, a router performs a search (lookup) of the shape graph 404 using a prefix for the destination address in the packet. The lookup starts at the root node 438 of the shape graph 404. Based on each successive bit (starting at the most significant bit) of the prefix, the router traverses to the left or right of the respective shape graph node. The router also maintains a traversal counter that starts at zero, for example. Each traversal to the right of a node causes the traversal counter to increment by the DNC of the current node. Each traversal to the left of a node leaves the traversal counter unchanged. For example, assume that the prefix for a packet has "01" as the most significant bits. The most significant bit ("0") of the prefix causes the router to take the left branch from the root node 438 to the shape graph node 434; as a result, the traversal counter remains unchanged (remains at zero at this time). The next most significant bit ("1") of the prefix causes the router to take the right branch from the shape graph node 434 to the shape graph node 430; this traversal causes the traversal counter to increment by the DNC (the value "1") of the shape graph node 434. Since "01" is the longest matching prefix in the shape graph 404, the traversal counter value (which has incremented to one) is used as an index into the indexing array 440. An index value of one points to the second position (containing next hop information P2) of the indexing array 440. P2 is thus retrieved as the next hop information for routing the packet.

The following describes examples relating to updating the mapping table 400, trie 402, and shape graph 404 in response to a modification of the content of the routing table represented by the trie 402. The updated mapping table can then be used to incrementally update the shape graph 404 of FIG. 4C. In this manner, the shape graph for the updated routing table can be updated without having to reconstruct the entire shape graph.

The modification of a routing table can result in the insertion or deletion of nodes in the trie 402, as well as the corresponding incremental changes to the shape graph 404. Due to the bottom-up shape identification property, modification of a trie node only affects the shapes of the ancestor nodes in the trie. As a result, the affected trie nodes can be re-labeled by performing a bottom-up reconstruction of the affected nodes of the trie. Note that the child nodes of the affected trie nodes are not affected, and thus the shape IDs of the child nodes would not be changed.

FIGS. 5A-5C illustrate an example in which the prefix 1111* is inserted into the routing table. The inserted prefix 1111* is associated with a new next hop information P5. Effectively, a new routing table entry (1111*, P5) is inserted. A shape graph update process identifies the trie nodes that are affected by the insertion, and removes the respective shape IDs of these trie nodes. This is depicted in FIG. 5B, where the modified trie 402A has dashed circles to represent the affected nodes due to the insertion of the prefix 1111*. The insertion of the prefix 1111* results in the creation of a new leaf node 420D, which affects ancestor nodes of the new leaf node 420D (as represented by dashed circles). The insertion of the new leaf node 420D causes conversion of the leaf node 420C in the trie 402 of FIG. 4B to an intermediate node 502 in FIG. 5B. In addition, trie nodes 422, 426, and 428 of the trie 402 of FIG. 4B are modified to become trie nodes 504, 506, and 508, respectively, in the modified trie 402A of FIG. 5B. In FIG. 5B, the labels of the affected trie nodes 502, 504, 506, and 508 have been removed, due to disassociation of affected trie nodes from corresponding shape identifiers.

The newly added leaf node 420D has shape ID "1," as indicated in FIG. 5B. Since the number of leaf nodes in the modified trie 402A of FIG. 5B remains at three, the count in the mapping table entry 509 (corresponding to shape ID "1") remains at "3."

Due to disassociation of shape identifiers from the affected trie nodes 504, 506, and 508, the mapping table 400 of FIG. 4A is modified to become the mapping table 400A of FIG. 5A. Specifically, the count value for trie nodes 422, 426, and 428 in FIG. 4A are decremented in the mapping table 400A, such that the corresponding count values in respective entries of the mapping table 400A are decremented to zero (in entries 510, 512, and 514 in the mapping table 400A).

If the count value in a given mapping table entry (corresponding to a respective shape ID) is decremented to zero, then that indicates that there is no trie node associated with this shape ID. Such a mapping table entry does not have to be removed; however, this mapping table entry can be reused later or can be removed to obtain additional storage space in memory.

The shape graph 404 and indexing array 440 of FIG. 5C are identical to the shape graph 404 and indexing array 440 of FIG. 4C, since the shape graph 404 has not yet been modified at this point.

FIGS. 6A-6C illustrate a further update of the mapping table, trie node, and shape graph of FIGS. 5A-5C. In FIG. 6B, the updated trie 402B (updated from the trie 402A of FIG. 5B) includes nodes 502, 504, 506, and 508 that have been assigned respective shape IDs. The node 502 in the trie 402B has been assigned shape ID "3" (since it shares the same shape and has the same NHI flag value as the trie node 424). The trie nodes 504, 506, and 508 are assigned respective shape IDs "6," "7," and "8," which are new shape IDs. The new trie nodes 504, 506, and 508 have shapes that are new and did not already exist in the trie 402 of FIG. 4B.

Due to trie updating to form the updated trie 402B, corresponding mapping table entries are updated or added to form the updated mapping table 400B of FIG. 6A. A new key-value pair is inserted into the mapping table 400B for a key that does not match any entry of the mapping table. If a key results in a match to an entry of the mapping table, then the corresponding entry of the mapping table is updated by incrementing the corresponding count field in the value 408.

In the updated mapping table 400B, new entries 602, 604, and 606 (including new key-value pairs) have been added for respective nodes 504, 506, and 508. Moreover, an entry 608 of the updated mapping table 400B has been updated to increment the count for shape ID "3" to the count value "2."

Based on the content of the updated mapping table 400B of FIG. 6A, the shape graph is modified to become the updated shape graph 404A of FIG. 6C. The newly added mapping table entries 602, 604, and 606 result in creation of new shape graph nodes 610, 612, and 614, respectively. The decrementing of count values in the mapping table entries 510, 512, and 514 result in deletion of respective shape graph nodes 432, 436, and 438 (as indicated by dashed circles in FIG. 6C).

In mapping table entry 608 depicted in FIG. 6A, the respective count value has been incremented to "2" since another trie node (502) having shape ID "3" has been added.

The updated shape graph 404A of FIG. 6C is associated with an updated indexing array 440A. The updated indexing array 440A includes another position for next hop information P5 associated with the newly inserted prefix 1111*.

In some implementations, as the shape graph is being updated, the original indexing array 440 can be saved to a different storage location. After both the shape graph and the indexing array have been updated to form shape graph 404A and indexing array 404A, the root pointer 439 can be modified to point to the new indexing array 404A instead of the previous indexing array.

The insertion procedure for a new prefix is performed in a bottom-up manner in the trie. As the affected trie nodes are only in the path between an inserted dark node and the root node, the procedure re-labels the trie nodes along the path to complete the update.

FIGS. 7A-7E illustrate an example in which the prefix 111* is deleted from the routing table corresponding to the data structures shown in FIGS. 4A-4C.

Deleting the prefix 111* means that the respective next hop information P4 is also deleted. Deleting the routing table entry (111*, P4) would lead to deletion of trie nodes 422 and 420C in the trie 402 of FIG. 4B. The deletion of these two trie nodes is depicted in modified trie 402C in FIG. 7B. In the modified trie 402C, the trie nodes 422 and 420C have been deleted, and the trie nodes 426 and 428 of FIG. 4B have been replaced with dashed nodes 702 and 704 whose shape IDs have been removed. The deletion of trie nodes 422 and 420C results in updates of entries 706 and 708 in modified mapping table 400C of FIG. 7A.

In mapping table entry 706, the count value for shape ID "1" has been decremented from "3" to "2." In mapping table entry 708, the count value for shape ID "2" has been decremented from "1" to "0."

Figures 7A, 7B, 7C:
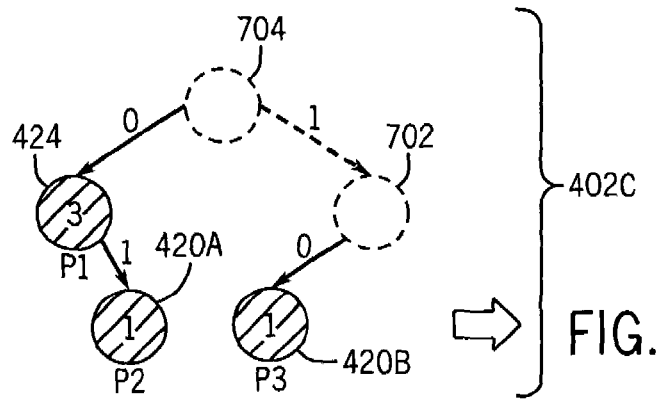

Also, due to removal of the shape IDs of nodes 702 and 704 in the modified trie 402C of FIG. 7B, the respective entries 710 and 712 of the modified mapping table 400C have been updated to decrement the respective count values to "0."

Figures 7D, 7E:
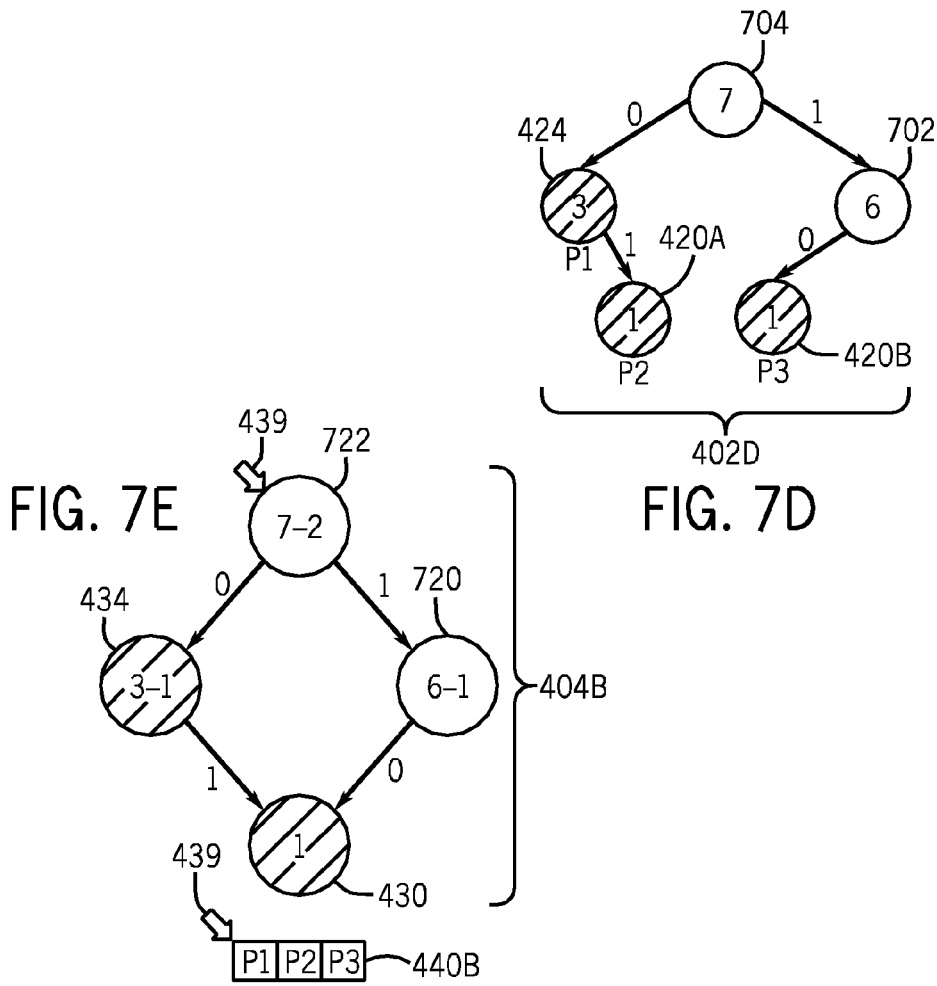

Next, as shown in a further modified trie 402D of FIG. 7D, the trie nodes 702 and 704 are re-labeled with respective shape IDs "6" and "7." Based on re-labeling of the trie nodes 702 and 704, new entries 714 and 716 (correspond to shape IDs "6" and "7") are added to the further modified mapping table 400D of FIG. 7C.

The shape graph is modified to form modified shape graph 404B, which is associated with modified indexing array 440B. The modified shape graph 404B has new shape graph nodes 720 and 722 corresponding to new mapping table entries 714 and 716 in the updated mapping table 400D of FIG. 7C. In addition, the modified shape graph 404B is without shape graph nodes 432, 436, and 438 that were in the shape graph 404 of FIG. 4C.

Deletion of a prefix from a trie also proceeds in a bottom-up manner, similar to the insertion procedure. The affected sub-tries are in the path from the deleted dark node to the root node of the trie. If the deleted dark node is a leaf node, the leaf node is removed.

An example pseudo code, Insertion_Update( ), for insertion of a prefix is shown below:

```
1: Insertion_Update(cur_node, root)
2: Begin
3:   while(cur_node) do //the parent of root is null
4:     if(cur_node is a leaf node)
5:     then
6:       [Initialize the number of left side dark nodes and shape ID]
7:       lShape = rShape = 0
8:     else
9:       [Decrease the counter of original shape of cur_node by 1,
        if the counter is equal to 0, recycle the shape]
10:      lShape = shape ID of left sub-trie
11:      rShape = shape ID of right sub-trie
12:      [Compute the number of left side dark nodes]
13:    If (triple<lShape, rShape, validity flag> exists in mapping table)
14:    then
15:      shape_id = mapping(triple<lShape, rShape, validity flag>);
16:      shape_counter[shape_id]++
17:    else
18:      shape_id = [allocate a new shape ID]
19:      shape_counter[shape_id] = 1
20:      [insert a pair (triple<lShape, rShape, validity flag>, <shape_id,
        number of left side dark nodes>) into mapping table}
21:      cur_node.shape = shape_id
22:      cur_node = cur_node's parent
23: End
```

An example pseudo code, Deletion_Update( ), for deletion of a prefix is according to the pseudo code below:

```
1: Deletion_Update(cur_node, root)
2: Begin
3:   while(cur_node and cur_node is a leaf node) do //the parent of root is
     null
4:     [Decrease the counter of original shape of cur_node by 1,
       if the counter is equal to 0, recycle the shape]
5:     [remove the cur_node in the trie]
6:     cur_node = cur_node's parent
7:   while(cur_node) do //the parent of root is null
8:     [Decrease the counter of original shape of cur_node by 1,
       if the counter is equal to 0, recycle the shape]
9:     lshape = shape ID of left sub-trie
10:    rShape = shape ID of right sub-trie
11:    [Update the number of left side dark nodes]
12:    If (triple<lShape, rShape, validity flag> exists in mapping table)
13:    then
14:      shape_id = mapping(triple<lShape, rShape, validity flag>);
15:      shape_counter[shape_id]++
16:    else
17:      shape_id = [allocate a new shape ID]
18:      shape_counter[shape_id] = 1
19:      [insert a pair (triple<lShape, rShape, validity flag>, <shape_id,
        number of left side dark nodes>) into mapping table}
20:      cur_node.shape = shape_id
21:      cur_node = cur_node's parent
22: End
```

When the next hop information is updated, only the next hop information of a dark node is changed. As a result, the update of the shape graph in response to a change of next hop information is relatively simple, since a lookup procedure can be performed to find the node of the shape graph corresponding to the updated next hop information, and the corresponding position in the indexing array can be updated with the new next hope information.

The incremental update process discussed above can also be applied in a cold-start scenario, which is a scenario when the routing table is initially empty. The incremental update process can be performed as content is added to the routing table. The construction of the shape graph can use the insertion procedure discussed above.

Figure 8:
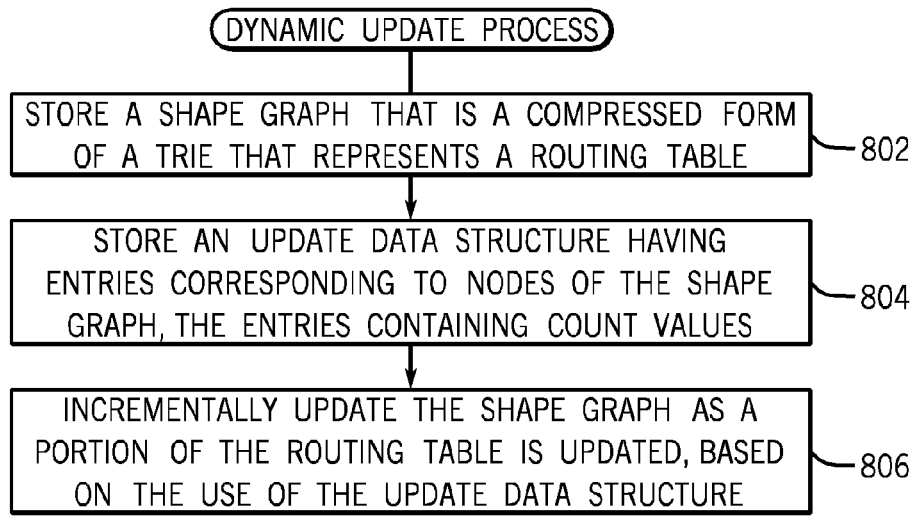
FIG. 8 is a flow diagram of a dynamic update process of a shape graph according to some implementations.

FIG. 8 is a flow diagram of a process of performing dynamic update of a shape graph in response to an update of routing information in a routing table, in accordance with some implementations. The process includes storing (at 802) a shape graph that is a compressed form of a trie that represents a routing table that contains routing information for routing data packets in a network. The process further stores (at 804) an update data structure (e.g. mapping table) that includes multiple entries corresponding to nodes of the shape graph, where the multiple entries contain count values indicating respective numbers of nodes of the trie represented by the corresponding nodes of the shape graph.

In response to an update of a portion of the routing table, the process incrementally updates (at 806) a shape graph using information in the update data structure.

Figure 9:
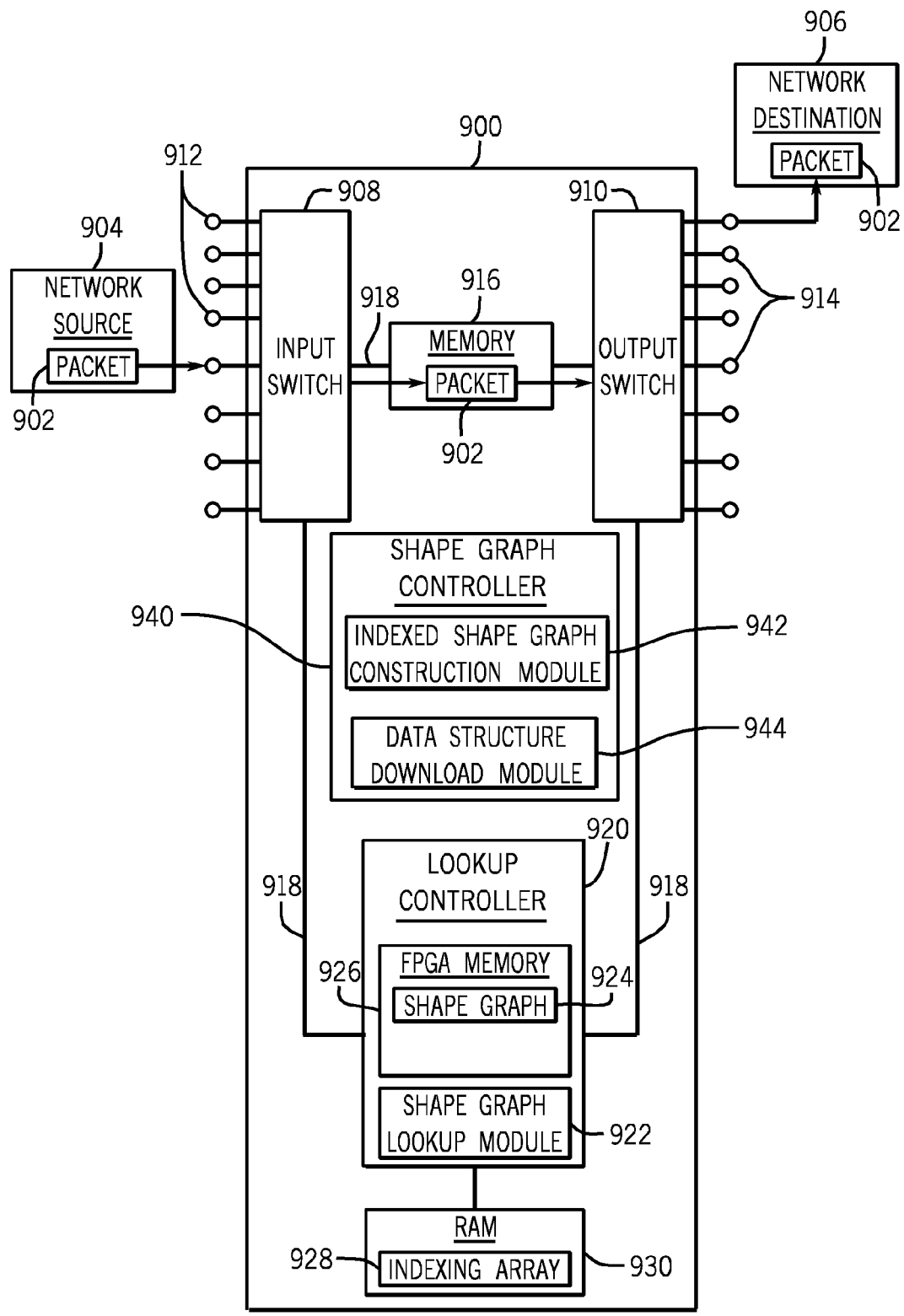
FIG. 9 is a block diagram of an example router that may be used to route a packet from a network source to a network destination, in accordance with some implementations.

FIG. 9 is a block diagram of a router 900 that may be used to route a packet 902 from a network source 904 to a network destination 906. The router 900 may be implemented within the networking environment 100 discussed above with respect to FIG. 1, for example. The network source 904 may be a source computing device, or a network node, such as another router, that is along the packet's route to a destination computing device. In addition, the network destination 906 may be the destination computing device to which the packet 902 is to be routed, or may be a network node, such as another router, that is along the packet's route to the destination computing device.

The router 900 may include an input switch 908 configured to receive the packet 902 from the network source 904, and an output switch 910 configured to send the packet to the network destination 906. The input switch 908 may include a number of input ports 912, and each input port 912 may be connected to a different network node, such as another router or a computing device. For example, the network source 904 may be connected to one of the input ports 912, as shown in FIG. 9. In addition, the output switch 910 may include a number of output ports 914, and each input port 914 may be connected to a different network node, such as another router or a computing device. For example, the network destination 906 may be connected to one of the input ports 914, as shown in FIG. 9. The router 900 may include an equal number of input ports 912 and output ports 914, as shown in FIG. 9, or may include more input ports 912 or more output ports 914, depending on the details of a specific implementation.

The router 900 may include a memory device 916 that is to store the packet 902 received from the network source 904 until the appropriate network destination 906 has been determined. The memory device 916 may include random access memory (RAM), read only memory (ROM), flash memory, or any other suitable memory device. The memory device 916 may be connected to the input switch 908 and the output switch 910 via a data bus 918. The data bus 918 may enable the transfer of the data packet 902 between the input switch 908 and the output switch 910.

Further, the router 900 may include a lookup controller 920 that is configured to direct the routing of the packet 902. The lookup controller 920 may be connected to the input switch 908 and the output switch 910 via the data bus 918. Thus, the lookup controller 920 may be configured to determine routing information relating to the data packet 902 as it is received at the input switch 908. Such routing information may be used by the lookup controller 920 to perform a shape graph lookup procedure via a shape graph lookup module 922. According to examples described herein, the shape graph lookup module 922 may be any type of application or program executable by the lookup controller 920 that is configured to perform such a shape graph lookup procedure. The shape graph lookup procedure may include searching a shape graph 924 that is stored in an on-chip field-programmable gate array (FPGA) memory 926, e.g. an FPGA memory that is part of the lookup controller 920, which may be implemented with an FPGA. In some examples, the FPGA memory 926 may include any other suitable type of memory, such as RAM, ROM, flash memory, or the like. In other examples, instead of implementing the lookup controller 920 with an FPGA, the controller 920 can be implemented with another type of hardware processing circuit, such as an application programming integrated circuit, a microcontroller, a microprocessor, and so forth.

The shape graph 924 may be searched to determine next hop information based on a longest matching prefix for the IP address of the network destination 906 referred to in the packet's routing information. The next hop information may include an output port index for routing the packet 902.

Once the output port index has been determined, the shape graph lookup module 922 may determine a corresponding output port 914 for routing the packet 902 to the appropriate network destination 906. This may be accomplished by searching an output port indexing array 928 stored within off-chip RAM 930, e.g. RAM that is stored outside of the lookup controller 920. The RAM 930 may be accessed by the shape graph lookup module 922 via the data bus 918. The RAM 930 may include, for example, dynamic RAM (DRAM), static RAM (SRAM), or the like. Further, in some examples, the RAM 930 may include any other suitable type of memory, such as ROM, flash memory, or the like.

The lookup controller 920 may then send the information relating to the appropriate network destination 906 to the output switch 906. The output switch 906 may retrieve the packet 902 from the memory 916, and forward the packet 902 to the network destination 906.

The router 900 can also include a shape graph controller 940, which may be separate from the lookup controller 920. Alternatively, the shape graph controller 940 may be integrated with the lookup controller 920. The shape graph controller 940 includes an indexed shape graph construction module 942 that is used to incrementally update the shape graph 924, using a mapping table (as discussed above) to perform the incremental update. The mapping table may be contained as part of the indexed shape graph construction module 942.

The shape graph controller 940 can also include a data structure download module 944, which can be used to download data structures, such as the shape graph 924 and the indexing array 928, to the lookup controller 920 and the RAM 930 whenever the shape graph 924 and the indexing array 928 are updated.

In other examples, instead of using the router 900 arranged as in FIG. 9, routers with other arrangements can be employed.

In some implementations, machine-readable instructions (software or firmware) can be executed in the controllers 920 and 940. Data and instructions can be stored in respective storage devices, which are implemented as one or multiple computer-readable or machine-readable storage media (such as 926, 930, and so forth). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    storing, by a router having a processor, a shape graph that is a compressed form of a trie that represents routing information for routing data packets in a network;
    storing, by the router, an update data structure that includes plural entries corresponding to nodes of the shape graph, the plural entries containing count values indicating respective numbers of nodes of the trie represented by the corresponding nodes of the shape graph;
    incrementally updating, by the router, the shape graph as a portion of the routing information changes, wherein the incremental updating uses the count values in the update data structure, wherein the shape graph is associated with plural elements containing respective next hop information; and
    in response to receiving a packet to route, traversing the shape graph to retrieve the next hop information of one of the plural elements.

2. The method of claim 1, further comprising:
    receiving, by the router, the packet containing an address;
    searching, by the router, the shape graph based on a prefix for the address; and
    routing, by the router, the packet to a next network segment based on searching the shape graph.

3. The method of claim 1, wherein the update data structure is used for incrementally updating the shape graph but not for routing packets by the router.

4. The method of claim 1, wherein storing the update data structure comprises storing key-value pairs in the respective plural entries of the update data structure, and wherein each key includes a shape identifier of a left child of a corresponding node in the trie, a shape identifier of a right child of the corresponding node in the trie, and an indicator regarding whether the corresponding node is associated with next hop information, and wherein incrementally updating the shape graph uses the keys and values of the key-value pairs in the respective plural entries of the update data structure.

5. The method of claim 4, wherein each of the plural entries of the update data structure further includes a respective shape identifier to indicate a shape of one or multiple nodes of the trie merged into a respective node of the shape graph, and wherein incrementally updating the shape graph uses the shape identifiers in the respective plural entries of the update data structure.

6. The method of claim 1, further comprising:
in response to the change in the portion of the routing information, modifying at least one count value in the update data structure,
wherein incrementally updating the shape graph uses the modified at least one count value in the update data structure.

7. The method of claim 6, wherein each of the plural entries of the update data structure further includes a respective shape identifier to indicate a shape of one or multiple nodes of the trie merged into a respective node of the shape graph, wherein the change in the portion of the routing information causes at least one shape identifier to no longer be used, wherein modifying the at least one count value comprises decrementing the at least one count value, and wherein incrementally updating the shape graph uses the decremented at least one count value in the update data structure.

8. The method of claim 6, wherein each of the plural entries of the update data structure further includes a respective shape identifier to indicate a shape of one or multiple nodes of the trie merged into a respective node of the shape graph, wherein the change in the portion of the routing information causes addition of a node to the trie that is assigned a particular shape identifier, and wherein modifying the at least one count value comprises incrementing the at least one count value that corresponds to the particular shape identifier.

9. A router comprising:
a storage medium to store:
a shape graph that is a compressed form of a trie that represents routing information for routing data packets in a network, and
an update data structure that includes plural entries corresponding to nodes of the shape graph, the plural entries containing shape identifiers and count values indicating respective numbers of nodes of the trie assigned the respective shape identifiers; and
at least one controller comprising a hardware processor, the at least one controller to:
incrementally update, using the count values in the update data structure, a portion of the shape graph in response to a change of a portion of the routing information;
receive a packet to route;
determine a prefix for a destination address in the packet;
traverse the shape graph to retrieve next hop information based on the prefix; and
use the retrieved next hop information to route the packet to the next network segment.

10. The router of claim 9, wherein the incremental update comprises:
identifying affected nodes of the trie;
disassociating shape identifiers from the affected nodes; and
modifying the update data structure based on the disassociating.

11. The router of claim 10, wherein the incremental update further comprises:
assigning further shape identifiers to the affected nodes; and
further modifying the update data structure based on the assigning of the further shape identifiers.

12. The router of claim 9, wherein the shape graph is associated with an indexing array having plural positions containing corresponding next hop information, and wherein the at least one controller is to obtain an index value based on traversing the shape graph using the prefix, wherein the index value points to one of the plural positions.

13. The router of claim 9, wherein the change of the portion of the routing information comprises an insertion of a prefix into the trie, and wherein incrementally updating the update data structure comprises:
in response to the insertion of the prefix into the trie, adding a node to the shape graph and deleting a node from the shape graph.

14. The router of claim 13, wherein the insertion of the prefix into the trie causes a decrement of a first count value of the count values to zero, and wherein the deleting of the node from the shape graph is in response to the decrementing of the first count value to zero.

15. The router of claim 9, wherein the change of the portion of the routing information comprises a deletion of a prefix from the trie, and wherein incrementally updating the update data structure comprises:
in response to the deletion of the prefix from the trie, deleting a node from the shape graph.

16. The router of claim 15, wherein the deletion of the prefix from the trie causes a decrement of a first count value of the count values to zero, and wherein the deleting of the node from the shape graph is in response to the decrementing of the first count value to zero.

17. An article comprising at least one non-transitory machine-readable storage medium storing instructions that upon execution cause a router to:
store a shape graph that is a compressed form of a trie that represents routing information for routing data packets in a network;
store a mapping table that includes plural entries corresponding to nodes of the shape graph, the plural entries containing count values indicating respective numbers of nodes of the trie represented by the corresponding nodes of the shape graph;
incrementally update the shape graph as a portion of the routing information changes, wherein the incremental updating uses the count values in the mapping table;
receive a packet containing an address;
search the shape graph based on a prefix for the address; and
route the packet to a next network segment based on searching the shape graph.

18. The article of claim 17, wherein the incremental update comprises:
identifying affected nodes of the trie;
disassociating shape identifiers from the affected nodes; and
modifying the update data structure based on the disassociating.

19. The article of claim 18, wherein the incremental update further comprises:

assigning further shape identifiers to the affected nodes; and further modifying the update data structure based on the assigning of the further shape identifiers.

20. The article of claim 17, wherein the change of the portion of the routing information causes a decrement of a first count value of the count values to zero, and wherein the incremental update comprises deleting a node from the shape graph in response to the decrementing of the first count value to zero.

* * * * *